United States Patent [19]
Gross

[11] Patent Number: 5,309,178
[45] Date of Patent: May 3, 1994

[54] LASER MARKING APPARATUS INCLUDING AN ACOUSTIC MODULATOR

[75] Inventor: Abraham Gross, Rehovot, Israel

[73] Assignee: Optrotech Ltd., Ziona, Israel

[21] Appl. No.: 882,457

[22] Filed: May 12, 1992

[51] Int. Cl.$^5$ .............. G01D 15/14; G02F 1/11; H04N 1/00

[52] U.S. Cl. .............. 346/108; 346/76 L; 359/286

[58] Field of Search ............. 346/107 R, 108, 76 L, 346/160; 359/285, 286, 311, 204

[56] References Cited

U.S. PATENT DOCUMENTS

| | | | |
|---|---|---|---|
| 4,201,455 | 5/1980 | Vadäsz et al. | 359/286 |
| 4,244,005 | 1/1981 | Jurgensen . | |
| 4,506,275 | 3/1985 | Maeda | 346/108 |
| 4,516,838 | 5/1985 | Bademian | 350/358 |
| 4,520,047 | 5/1985 | Hillemanns et al. | 427/331 |
| 4,520,472 | 5/1985 | Reno | 369/112 |
| 4,540,245 | 9/1985 | Bademian | 359/311 |
| 4,617,578 | 10/1986 | Nezu et al. | 346/108 |
| 4,634,232 | 1/1987 | Tateoka | 359/204 X |
| 4,667,300 | 5/1987 | Guilfoyle . | |
| 4,743,091 | 5/1988 | Gelbart | 350/252 |
| 4,810,068 | 3/1989 | Shimazu et al. | 359/285 |
| 4,960,320 | 10/1990 | Taniura | 359/285 |

FOREIGN PATENT DOCUMENTS 0422956 4/1991 European Pat. Off. .

*Primary Examiner*—Joan H. Pendegrass
*Attorney, Agent, or Firm*—Darby & Darby

[57] ABSTRACT

A laser marking apparatus includes at least one laser beam source, a multichannel acoustic modulator defining a plurality of at least partially overlapping modulation regions, apparatus for directing at least one laser beam from the at least one laser beam source through the multichannel acoustic modulator such that each laser beam extends across at least two of the at least partially overlapping modulation regions, and imaging apparatus for directing light from the modulator to a laser marking image plane.

11 Claims, 5 Drawing Sheets

LASER MARKING APPARATUS INCLUDING AN ACOUSTIC MODULATOR

FIELD OF THE INVENTION

The present invention relates to laser imaging generally and more particularly to laser imaging employing an acoustic modulator.

BACKGROUND OF THE INVENTION

Laser imaging using acoustic modulators has been proposed in the prior art. U.S. Pat. No. 4,617,578 describes a method for recording a plurality of reproduction picture images of an original picture in which multiple laser beams are modulated by an acoustic-optical modulator according to picture signals obtained by scanning an original picture. U.S. Pat. No. 4,520,472 describes an optical record and playback system for use in a multi-channel data processing system. An optical head, which includes a laser diode array, and optics which collects the laser beams emitted by the diode array, expands the beam cross section to form circular beams and focuses the beams to diffraction limited spots.

U.S Pat. No. 4,506,275 describes an image scanning and recording device employing an acousto-optic modulator associated with a plurality of optical fibers which couple light from individual channels of the modulator output to a recording medium.

U.S. Pat. No. 4,516,838 describes an acousto-optic modulator having an overlapping electrode structure. Although possible color plotter applications are mentioned, no suggestion is provided as to how to overcome problems of optical interference resulting from the overlap.

U.S. Pat. No. 4,743,091 describes a two dimensional laser diode array which is imaged down onto an optical recording medium which is moving relative to the image of the array.

Generally in the prior art of scanners, multi-channel modulators are employed in a manner such that each beam is modulated separately. The various beams are isolated in order to avoid mutual interference, thus complicating the system.

SUMMARY OF THE INVENTION

The present invention seeks to provide improved apparatus for laser marking which avoids the limitations of the prior art.

There is thus provided in accordance with a preferred embodiment of the present invention laser marking apparatus including:
  at least one laser beam source;
  a multichannel acoustic modulator defining a plurality of at least partially overlapping modulation regions;
  apparatus for directing at least one laser beam through the multichannel acoustic modulator such that each laser beam extends across at least two of the at least partially overlapping modulation regions; and
  imaging apparatus for directing light from the modulator to a laser marking image plane.

Additionally in accordance with a preferred embodiment of the present invention there is providing laser marking apparatus including:
  at least one multimode laser beam source;
  a multichannel acoustic modulator defining a plurality of at least partially overlapping modulation regions;
  apparatus for directing at least one laser beam through the multichannel acoustic modulator; and
  imaging apparatus for directing light from the modulator to a laser marking image plane In the preceding embodiments there may also be provided apparatus for controlling the operation of the acoustic modulator such that variations in the intensity of the at least one laser beam source are compensated by corresponding variations in the acoustic power supplied at the plurality of modulation regions.

Additionally in accordance with a preferred embodiment of the present invention there is provided laser marking apparatus including:
  at least one laser beam source;
  a multichannel acoustic modulator defining a plurality of at least partially overlapping modulation regions extending in a plane;
  apparatus for directing at least one laser beam through the multichannel acoustic modulator;
  apparatus for controlling the operation of the acoustic modulator such that variations in the intensity profile of the at least one laser beam source are compensated by corresponding variations in the acoustic power supplied at the plurality of modulation regions; and
  imaging apparatus for directing light from the modulator to a laser marking image plane Preferably, the laser marking apparatus also includes apparatus for operating the acoustic modulator in accordance with a data stream, for corresponding modulation of the laser beam In accordance with a preferred embodiment of the present invention there is also provided a laser marking substrate at the image plane which undergoes movement relative to the acoustic modulator.

Additionally in accordance with a preferred embodiment of the present invention apparatus is provided for coordinating relative movement of the substrate and the modulator with the data stream.

Preferably two laser beams are combined by apparatus of a polarizing beam splitter upstream of the acoustic modulator Apparatus may provide selectable delays to portions of the data stream employed for governing the operation of corresponding ones of the plurality of modulation regions.

The laser beam source may include a laser diode or a laser source such as a Nd:YAG laser or an argon ion laser or any functional equivalent.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1A:
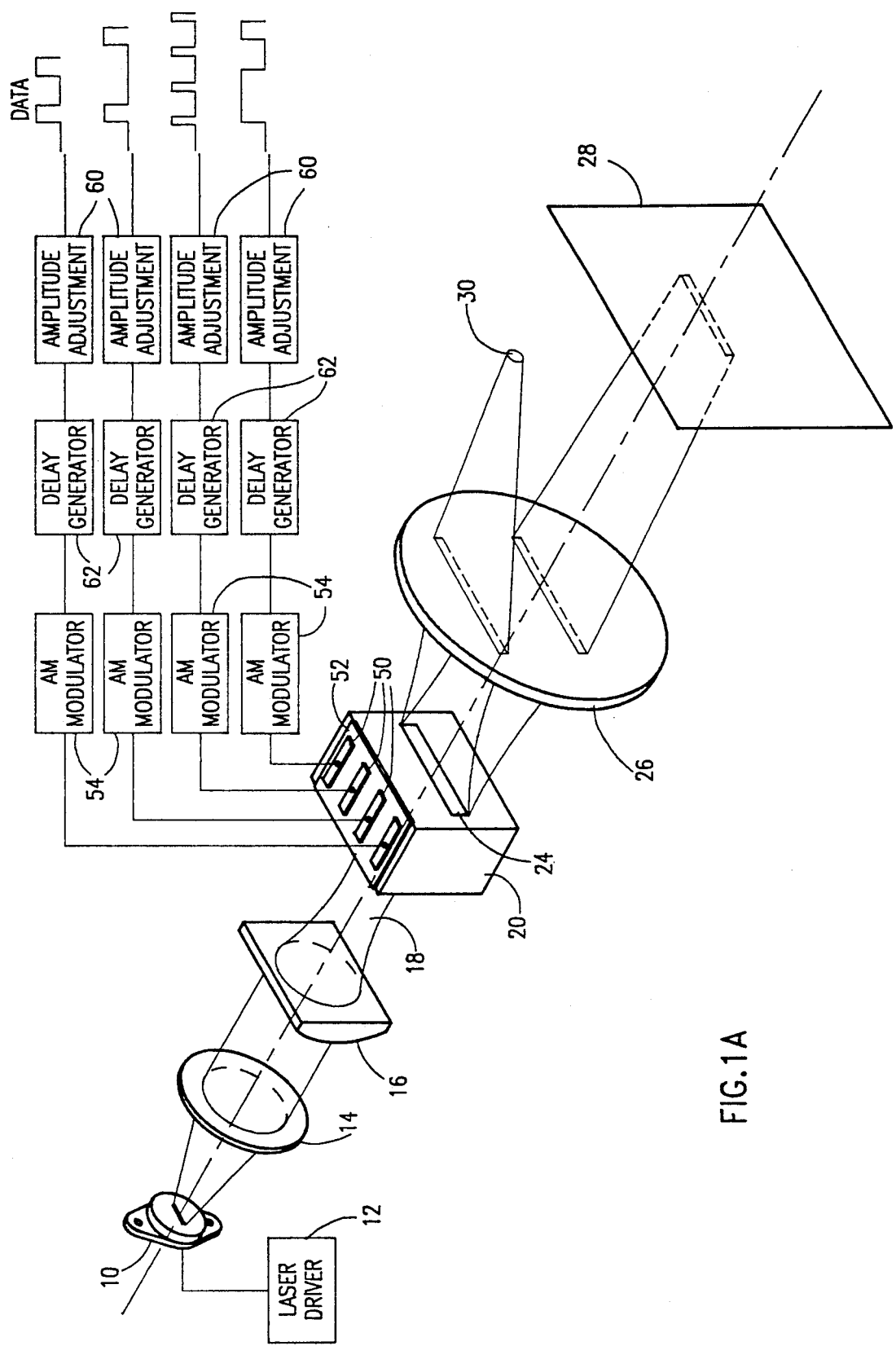
FIGS. 1A and 1B are simplified pictorial illustrations of two alternative embodiments of laser marking apparatus constructed and operative in accordance with a preferred embodiment of the present invention.

Reference is now made to FIG. 1A, which illustrates a preferred embodiment of laser writing apparatus constructed and operative in accordance with a preferred embodiment of the present invention. The laser writing apparatus preferably comprises a laser diode 10, such as a CW single mode low power diode Model SDL-2430 commercially available from Spectra Diode Labs of the U.S.A., which is driven by a laser driver 12, such as a Model SDL-820, also commercially available from Spectra Diode Labs, and which provides an output beam which passes through a collimation lens 14.

The collimation lens 14 is operative to collect generally all of the laser light generated by laser diode 10 and to produce a generally elliptical beam which impinges on a cylindrical lens 16. The cylindrical lens 16 is operative to provide a partially flattened tubular beam 18 having a generally flat "waist" location.

A multi-channel acoustic modulator 20, such as a modified Model MC 80, commercially available from Crystal Technology Inc. of the U.S.A., is provided in operative engagement with the tubular beam 18. The acoustic modular includes a plurality of individually controllable acoustic columns 22 (FIG. 2), which at least partially overlap at a region 24. The acoustic modulator 20 is located such that the waist of beam 18 extends through region 24, as illustrated.

Collimation lens 14 is operative to collimate the laser diode output to an essentially parallel beam having a cross sectional configuration which generally matches the cross sectional size of region 24. Suitable collimation lenses are commercially available form Melles Griot of the U.S.A..

The cylindrical lens 16 is employed to compress the expanded beam produced by collimation lens 14 such that its rise time is small. For example, if a waist of 0.1 mm in thickness is produced, a rise time of the order of tens of nanoseconds may be realized, where $TeO_2$ is employed as the optical material of the modulator 20. Beam compression produced by lens 16 is also important to enable the waist of the beam to be located at the location within the modulator 20 wherein the overlapping acoustic waves produced by the individual columns diffract the laser light in a generally uniform manner.

Beam 18, which has been diffracted and thus modulated by the action of the at least partially overlapping acoustic columns 22 is imaged by a spherical lens or group of lenses 26 onto a recording medium 28. Undiffracted light from modulator 20 encounters a stop 30.

Where laser diode 10 is a low power diode, the recording medium 28 is preferably a material of high photosensitivity, such as silver halide film, or a xerographic substrate. Should writing on a relatively lower sensitivity medium, such as a thermally activated medium, be required, a higher power laser may be employed such as a high power multimode laser diode operating at 2–3 watts CW.

Figure 3A:
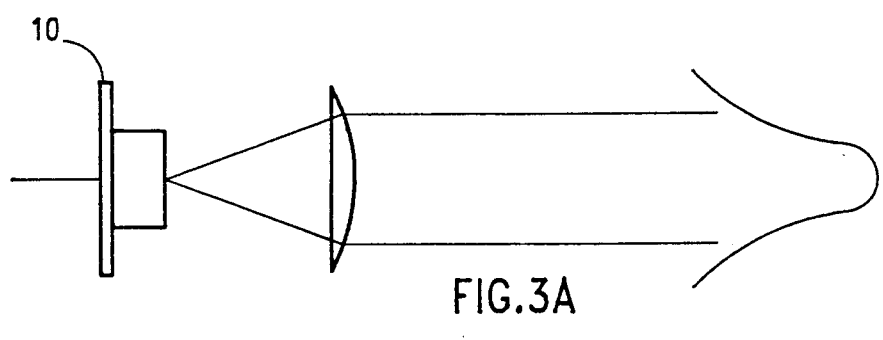
FIGS. 3A and 3B are simplified illustrations of the profile of a multi-mode laser beam in two mutually perpendicular planes.
Figure 3B:
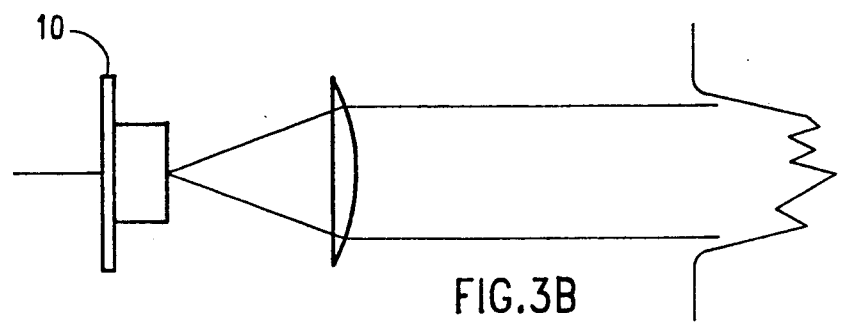

FIGS. 3A and 3B illustrate the configuration of the output of a multi-mode laser diode. It is appreciated that focusing such an output on a relatively small spot, i.e. of a few microns is either impossible or requires a high numerical aperture lens, leading to an unacceptably small depth of focus.

It is a particular feature of the present invention that by employing the multi-channel acoustic modulator as described, the laser beam need not be focussed to a single small spot but may instead be focussed to a plurality of contiguous pixels corresponding to the layout of the individual channels of the acoustic modulator. The requirements on the optics of lenses 14 and 16 are alleviated sufficiently to be readily achievable.

Generally speaking, the operation of the acoustic modulator is such that the application of RF power to an electrode of a given column of the acoustic modulator produces diffraction of the light passing therethrough and results in impingement of light on the recording medium. In the absence of the application of RF power to a given column, no diffraction is produced thereby and the undiffracted light impinges on stop 30 and not on the recording medium 28.

Figure 2:
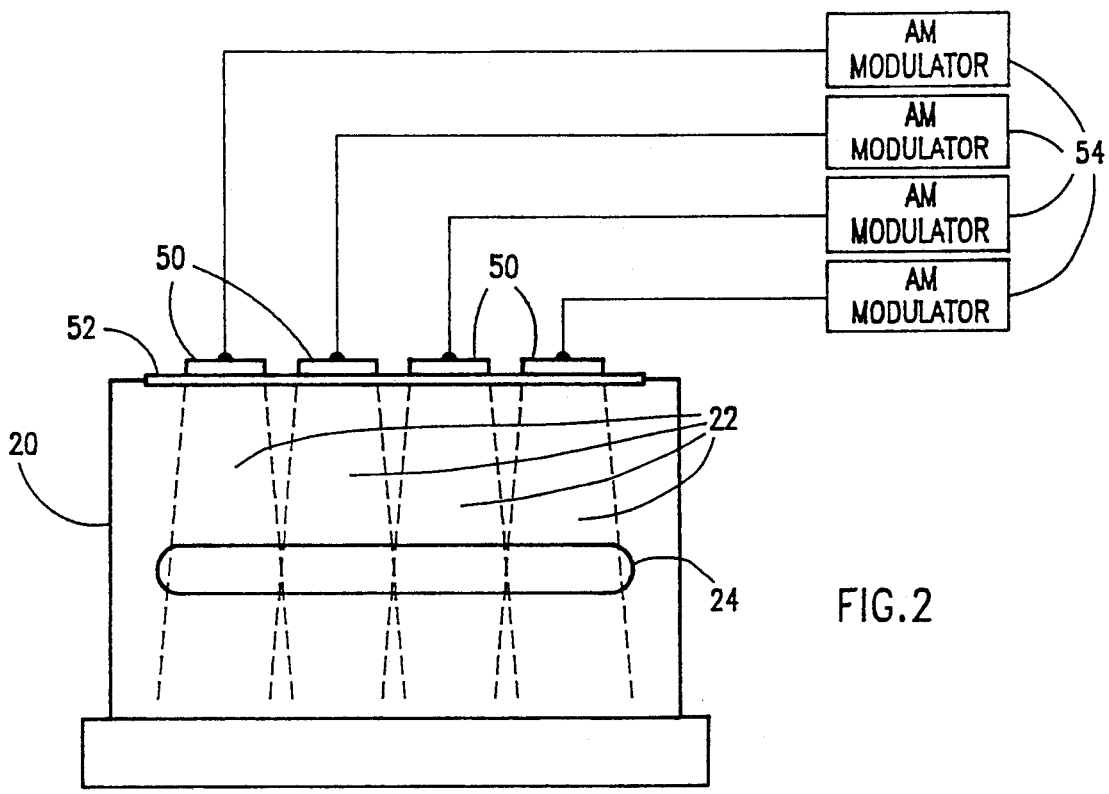
FIG. 2 is a simplified illustration of an acoustic modulator employed in the apparatus of FIGS. 1A and 1B.

Reference is now made to FIG. 2, which illustrates a multi-channel acoustic modulator 20, which is useful in the present invention. The modulator 20 comprises a plurality of electrodes 50 preferably having a pitch of 1 mm and a width of 0.8 mm, producing an inter-electrode spacing of 0.2 mm. Each electrode 50 is connected to a piezoelectric transducer 52 which operates at an RF frequency, such as 150 MHz Each electrode 50 is associated with a separate AM modulator 54.

Referring additionally to FIG. 1A, it is seen that each AM modulator 54 such as a Model 1180 of Crystal Technology Inc., receives an input stream of data which is employed to modulate a carrier at a given frequency. The data rate is preferably such that exposure of a corresponding pixel on the recording medium 28 matches the spot shape required for recording.

In accordance with a preferred embodiment of the present invention, the data input to each AM modulator passes through amplitude adjustment circuitry 60 and delay generator circuitry 62 in order to compensate for intensity and spatial distortions of the laser writing apparatus of the present invention. The operation of circuitry 60 and 62 is described hereinbelow with reference to FIGS. 4A–4C and 5A–5C.

In the above-described embodiment wherein the pitch of the electrodes 50 is 1 mm, using a $TeO_2$ crystal with an acoustic velocity of about 4.2 mm/microsecond, the exposure time for each pixel is 0.24 microsecond.

It is appreciated that for other acousto-optical material or other acoustic propagation modes, the configuration of the waist of beam 18 should be changed accordingly. By proper tuning of the angle between the incoming laser beam and the acoustic propagation vector in a conventional manner, diffraction efficiencies in excess of 80% can be achieved The modulator 20 acts as a transparency with a line of bright and dark pixels The focal length of lens 26 and its distance from modulator 20 are selected to provide a desired magnification ratio corresponding to a required final pixel size. For writing on PCBs for example, where a 12.5 m resolution is common, a reduction factor of 80 will match a 1 mm electrode pitch to the correct resolution. In such a case, lens 26 can comprise a conventional microscope objective.

Figure 1B:
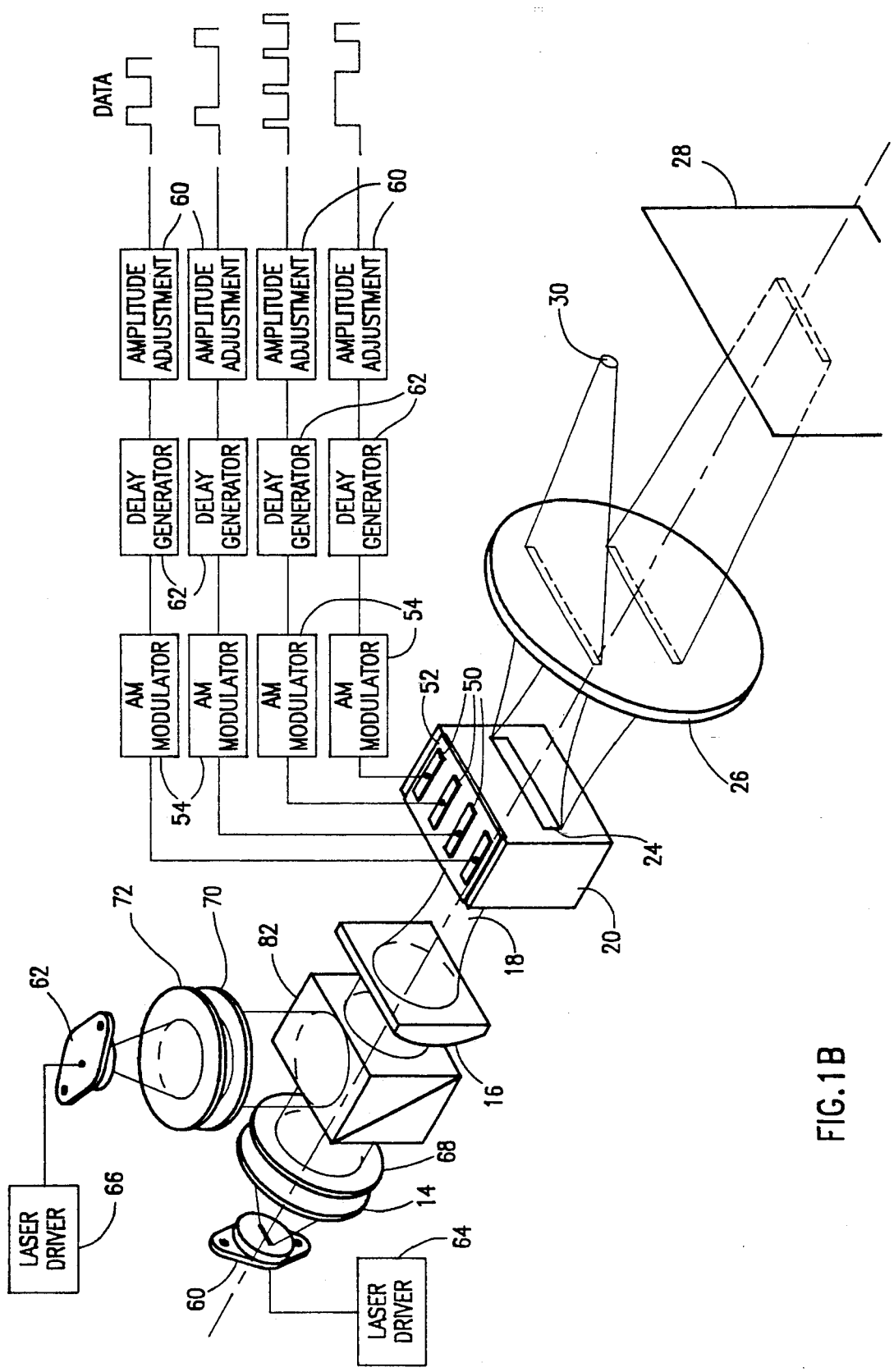

Reference is now made to FIG. 1B, which illustrates apparatus similar to that of FIG. 1A but employing a pair of laser diodes 60 and 62, each with a corresponding driver 64 and 66 and a retardation plate 68 and 70 in addition to a collimation lens 72. The retardation plates 68 and 70 are employed to rotate the polarization vectors of the laser diodes so that they can be combined without loss of energy by a polarizer beam splitter 82. Such retardation plates and beam splitters are commercially available from Melles Griot.

The remainder of the apparatus of FIG. 1B may be identical to that of FIG. 1A.

Figure 4A:
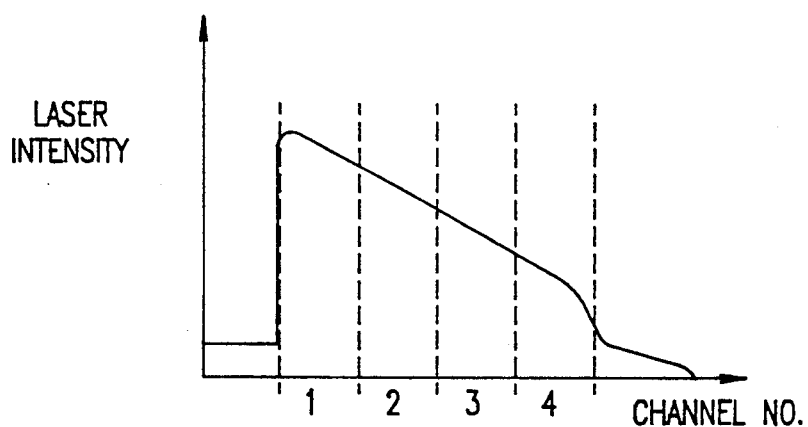
FIG. 4A is an illustration of a laser intensity profile of a multi-mode laser beam which is employed in a preferred embodiment of the present invention.
Figure 4B:
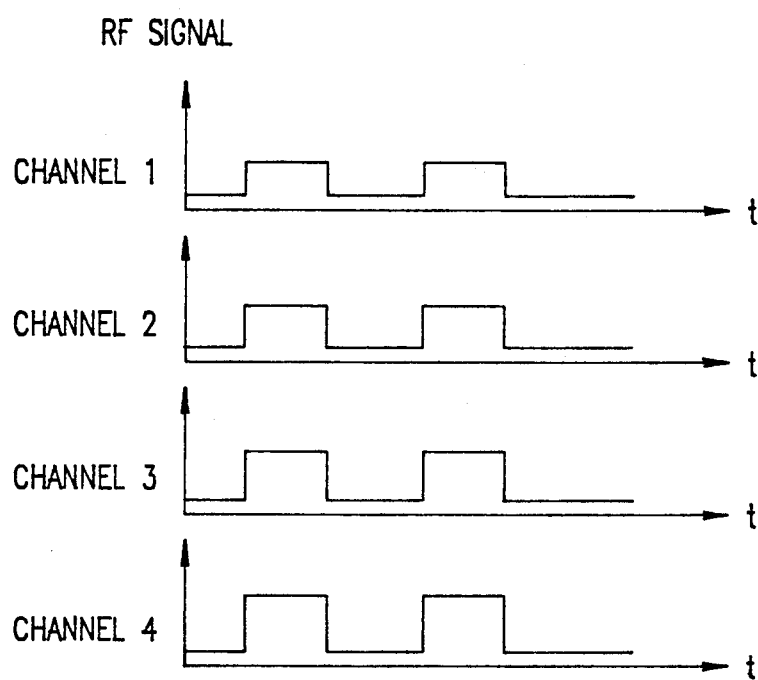
FIG. 4B is an illustration of the data signals received by AM modulators in accordance with a preferred embodiment of the present invention.
Figure 4C:
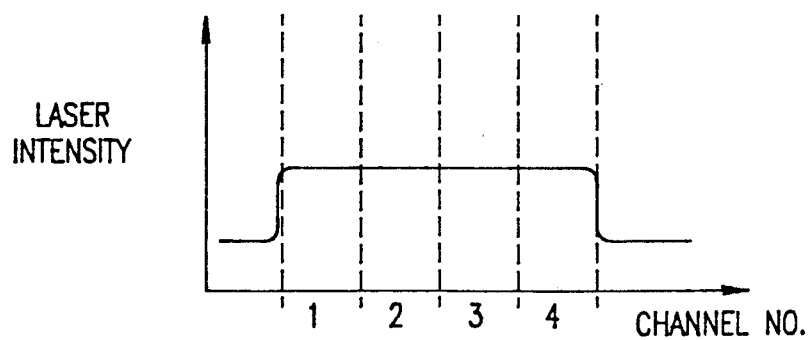
FIG. 4C is an illustration of the optical beam intensity profile of the output of the acousto-optic modulator in accordance with a preferred embodiment of the present invention.

Reference is now made to FIGS. 4A–4C which illustrate a technique for intensity compensation which is carried out by circuitry 60 in FIGS. 1A and 1B. FIG. 4A illustrates the typical laser beam intensity profile across the individual acousto-optic modulator channels of acousto-optic modulator 20.

In order to compensate for the non-uniform laser beam intensity impinging upon the various channels of modulator 20, amplitude adjustment circuitry 60 (FIGS. 1A and 1B) is operative to adjust the amplitude of the data signal supplied to the AM modulator 54 for each channel. In this way, the AM modulator 54 output signal provides an RF power input to the modulator 20 whose amplitude compensates for the variation in the laser intensity input at that channel, as well as for any other intensity variations in the modulator. The result is a relatively flat and uniform optical intensity output of the modulator 20 over all channels thereof, as illustrated in FIG. 4C.

Figure 5A:
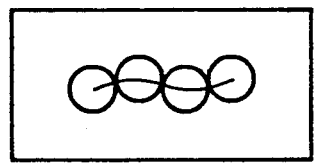
FIG. 5A is an illustration of a plurality of pixels written onto a recording medium in the absence of a delay correction.
Figure 5B:
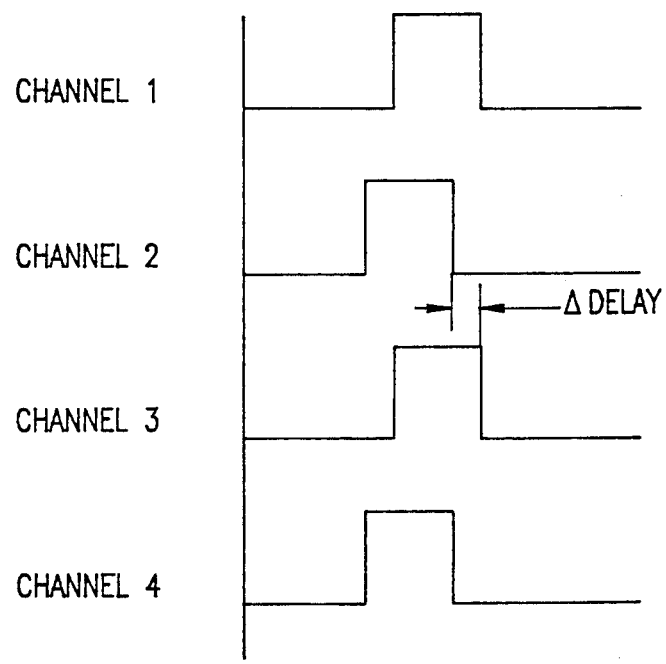
FIG. 5B is an illustration of mutually delayed data signals in accordance with a preferred embodiment of the present invention.
Figure 5C:
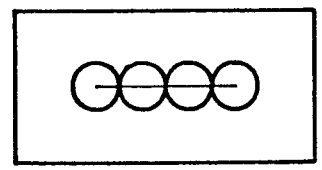
FIG. 5C is an illustration of a plurality of pixels written onto a recording medium following a delay correction.

Reference is now made to FIGS. 5A–5C which illustrate a technique for compensation for spatial distortions which is carried out by circuitry 62 in FIGS. 1A and 1B. FIG. 5A illustrates a typical non-straight arrangement of adjacent pixels which could result from system distortions in the laser writing system of FIGS. 1A and 1B, absent correction.

Circuitry 62 is operative to insert appropriate relative delays between the data signals of the various channels The delay circuitry 62, which may be any conventional delay circuitry, inserts a delay which is calibrated on the basis of precise empirical measurements of pixel locations produced by the laser writing apparatus. Such relative delays are illustrated in FIG. 5B.

FIG. 5C illustrates a relatively straight pixel arrangement which is the desired result of the correction produced by circuitry 62.

It will be appreciated by persons skilled in the art that the present invention is not limited by what has been particularly shown and described hereinabove. Rather the scope of the present invention is defined only by the claims which follow:

I claim:

1. Laser marking apparatus comprising:
   at least one multimode laser beam source providing a laser beam;
   a beam compressor receiving said laser beam and providing a partially flattened tubular output beam;
   a multichannel acoustic modulator defining a plurality of at least partially overlapping modulation regions extending in a plane;
   means for directing said partially flattened tubular output beam through said multichannel acoustic modulator; and
   imaging means for directing light from said modulator to a laser marking image plane.

2. Apparatus according to claim 1 and also comprising means for controlling the operation of said acoustic modulator such that variations in the intensity profile of the at least one laser beam source are compensated by corresponding variations in the acoustic power supplied at said plurality of modulation regions 3. Apparatus according to claim 1 and also comprising means for operating said acoustic modulator in accordance with a data stream, for corresponding modulation of said at least one laser beam 4. Apparatus according to claim 3 and also comprising means for providing a laser marking substrate at said image plane which undergoes movement relative to said acoustic modulator.

5. Apparatus according to claim 4 and also comprising means for coordinating the relative movement of the substrate and the modulator with the data stream.

6. Apparatus according to claim 3 and also comprising means for providing selectable delays to portions of said data stream employed for governing the operation of corresponding ones of said plurality of modulation regions.

7. Apparatus according to claim 1 and wherein said at least one laser beam comprising two laser beams which are combined by means of a polarizing beam splitter upstream of the acoustic modulator.

8. Apparatus according to claim 1 and wherein said at least one laser beam source comprises a laser diode.

9. Apparatus according to claim 1 and wherein said at least one laser beam source comprises a Nd:YAG laser.

10. Apparatus according to claim 1 and wherein said at least one laser beam source comprises an argon ion laser.

11. Apparatus according to claim 10 and wherein said beam compression means comprises a cylindrical lens and wherein said partially flattened tubular output beam has a generally flat waist region which is located at the at least partially overlapping modulation regions of said acoustic modulator.

* * * * *